United States Patent
Masterson et al.

(10) Patent No.: US 9,967,154 B2
(45) Date of Patent: May 8, 2018

(54) ADVANCED CUSTOMER SUPPORT SERVICES—ADVANCED SUPPORT CLOUD PORTAL

(71) Applicant: ORACLE INTERNATIONAL CORPORATION, Redwood Shores, CA (US)

(72) Inventors: John Masterson, Navan (IE); Larry Abramson, Orinda, CA (US); Sean Fitzpatrick, Brittas Bay (IE); Niall Flynn, Sandyford (IE); Antony Higginson, Widnes (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 13/937,970

(22) Filed: Jul. 9, 2013

(65) Prior Publication Data
US 2015/0019700 A1    Jan. 15, 2015

(51) Int. Cl.
*H04L 12/24* (2006.01)
*G06F 9/50* (2006.01)
*G06F 9/445* (2018.01)

(52) U.S. Cl.
CPC .............. *H04L 41/50* (2013.01); *G06F 8/60* (2013.01); *G06F 9/5072* (2013.01)

(58) Field of Classification Search
CPC .............................. H04L 41/50; G06F 9/5072
See application file for complete search history.

(56) References Cited

U.S. PATENT DOCUMENTS

| | | | |
|---|---|---|---|
| 6,016,394 A | 1/2000 | Walker | |
| 6,185,625 B1 | 2/2001 | Tso et al. | |
| 6,477,483 B1 | 11/2002 | Scarlat | |
| 6,738,811 B1 | 5/2004 | Liang | |

(Continued)

FOREIGN PATENT DOCUMENTS

| | | |
|---|---|---|
| CN | 1652087 | 8/2005 |
| CN | 101204042 A | 3/2006 |

(Continued)

OTHER PUBLICATIONS

Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.

(Continued)

*Primary Examiner* — Nicholas Taylor
*Assistant Examiner* — Sanjoy Roy
(74) *Attorney, Agent, or Firm* — Kilpatrick Townsend & Stockton LLP

(57) ABSTRACT

Administrative tasks and services associated with computer systems are simplified and streamlined with a platform architecture that supports remote administration, development, and deployment of services. A system is configured with a support cloud platform to allow automation of tasks and services and the reuse of components. The platform generates, stores, deploys, executes, and monitors services through their complete life cycle. Services may be designed, made available for deployment, deployed to a customer, executed and monitored using the platform.

19 Claims, 10 Drawing Sheets

(56) References Cited

U.S. PATENT DOCUMENTS

| | | |
|---|---|---|
| 6,973,489 B1 | 12/2005 | Levy |
| 7,177,866 B2 | 2/2007 | Holenstein et al. |
| 7,290,003 B1 | 10/2007 | Tong |
| 7,548,898 B1 | 6/2009 | Tarenskeen et al. |
| 7,580,862 B1 | 8/2009 | Montelo et al. |
| 7,693,983 B1 | 4/2010 | Gupta |
| 8,150,811 B1 | 4/2012 | Tarenskeen et al. |
| 8,271,757 B1 | 9/2012 | Chatterjee et al. |
| 8,606,894 B1 | 12/2013 | Fremont |
| 8,639,989 B1* | 1/2014 | Sorenson, III .......... H04L 63/08 709/224 |
| 8,924,353 B1 | 12/2014 | Patwardhan et al. |
| 8,943,032 B1 | 1/2015 | Xu et al. |
| 9,098,364 B2 | 8/2015 | Davis |
| 9,401,904 B1 | 7/2016 | Hankins et al. |
| 9,442,983 B2 | 9/2016 | Higginson et al. |
| 9,491,072 B2 | 11/2016 | Raghunathan et al. |
| 9,747,311 B2 | 8/2017 | Buehne et al. |
| 9,762,461 B2 | 9/2017 | Raghunathan et al. |
| 9,792,321 B2 | 10/2017 | Buehne et al. |
| 9,805,070 B2 | 10/2017 | Buehne et al. |
| 2001/0029502 A1 | 10/2001 | Oeda |
| 2002/0002578 A1 | 1/2002 | Yamashita |
| 2002/0019826 A1 | 2/2002 | Tan |
| 2002/0147645 A1* | 10/2002 | Alao et al. ....................... 705/14 |
| 2002/0177977 A1* | 11/2002 | Scarlat ................ G06F 11/3414 702/186 |
| 2002/0194329 A1 | 12/2002 | Alling |
| 2002/0198984 A1 | 12/2002 | Goldstein et al. |
| 2003/0066049 A1 | 4/2003 | Atwood et al. |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0167840 A1 | 8/2004 | Tully et al. |
| 2004/0178261 A1 | 9/2004 | Potonniee et al. |
| 2004/0181790 A1 | 9/2004 | Herrick |
| 2004/0260875 A1 | 12/2004 | Murotani et al. |
| 2005/0021567 A1 | 1/2005 | Holenstein et al. |
| 2005/0055446 A1 | 3/2005 | Chidambaran et al. |
| 2005/0102318 A1 | 5/2005 | Odhner et al. |
| 2005/0204241 A1 | 9/2005 | Tamakoshi |
| 2006/0059253 A1 | 3/2006 | Goodman et al. |
| 2006/0112247 A1 | 5/2006 | Ramany |
| 2006/0156086 A1 | 7/2006 | Flynn et al. |
| 2006/0173875 A1 | 8/2006 | Stefaniak |
| 2006/0179171 A1 | 8/2006 | Stefaniak |
| 2006/0179431 A1 | 8/2006 | Devanathan |
| 2006/0235899 A1 | 10/2006 | Tucker |
| 2006/0282825 A1 | 12/2006 | Taylor |
| 2007/0028234 A1* | 2/2007 | Sero .......................... G06F 8/62 717/174 |
| 2007/0150488 A1 | 6/2007 | Barsness |
| 2007/0239774 A1 | 10/2007 | Bodily et al. |
| 2007/0299892 A1 | 12/2007 | Nakahara |
| 2008/0247320 A1 | 10/2008 | Grah et al. |
| 2008/0313595 A1 | 12/2008 | Boulineau et al. |
| 2009/0070733 A1 | 3/2009 | Huang et al. |
| 2009/0113399 A1 | 4/2009 | Tzoref et al. |
| 2009/0126022 A1 | 5/2009 | Sakaki |
| 2009/0187413 A1* | 7/2009 | Abels et al. ....................... 705/1 |
| 2009/0210857 A1 | 8/2009 | Martineau |
| 2009/0238078 A1* | 9/2009 | Robinson ............... G06Q 10/06 370/241 |
| 2009/0313311 A1 | 12/2009 | Hoffmann et al. |
| 2010/0005097 A1 | 1/2010 | Liang |
| 2010/0082543 A1 | 4/2010 | Nagarajan |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2010/0262974 A1 | 10/2010 | Uyeda |
| 2011/0093436 A1 | 4/2011 | Zha et al. |
| 2011/0107327 A1 | 5/2011 | Barkie et al. |
| 2011/0161933 A1 | 6/2011 | Hudson |
| 2012/0017112 A1 | 1/2012 | Broda et al. |
| 2012/0041933 A1 | 2/2012 | Driesen |
| 2012/0150642 A1* | 6/2012 | Kandanala et al. ....... 705/14.53 |
| 2012/0221845 A1 | 8/2012 | Ferris |
| 2012/0254435 A1 | 10/2012 | Zhaofu |
| 2012/0265726 A1 | 10/2012 | Padmanabhan et al. |
| 2012/0284360 A1 | 11/2012 | Bense et al. |
| 2012/0297016 A1 | 11/2012 | Iyer et al. |
| 2012/0303739 A1 | 11/2012 | Ferris |
| 2012/0311128 A1 | 12/2012 | Pechanec et al. |
| 2013/0067298 A1 | 3/2013 | Li et al. |
| 2013/0085742 A1 | 4/2013 | Barker et al. |
| 2013/0085989 A1 | 4/2013 | Nayyar et al. |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 | 10/2013 | Rangaiah |
| 2013/0283364 A1 | 10/2013 | Chang et al. |
| 2013/0297802 A1* | 11/2013 | Laribi ..................... H04L 47/80 709/226 |
| 2013/0311968 A1 | 11/2013 | Sharma |
| 2013/0326028 A1 | 12/2013 | Cox et al. |
| 2013/0339419 A1 | 12/2013 | Emaru |
| 2014/0007216 A1 | 1/2014 | Ahn |
| 2014/0012960 A1 | 1/2014 | Chien et al. |
| 2014/0019212 A1 | 1/2014 | Lieblich et al. |
| 2014/0019961 A1 | 1/2014 | Neuse |
| 2014/0059559 A1 | 2/2014 | Alatorre et al. |
| 2014/0075033 A1* | 3/2014 | Doering et al. .............. 709/226 |
| 2014/0089809 A1 | 3/2014 | Levy et al. |
| 2014/0109053 A1 | 4/2014 | Vasudevan et al. |
| 2014/0129690 A1 | 5/2014 | Jaisinghani et al. |
| 2014/0172782 A1 | 6/2014 | Schuenzel et al. |
| 2014/0195636 A1 | 7/2014 | Karve et al. |
| 2014/0279890 A1 | 9/2014 | Srinivasan et al. |
| 2014/0337429 A1 | 11/2014 | Asenjo et al. |
| 2014/0344439 A1* | 11/2014 | Kempf et al. ................. 709/224 |
| 2014/0373011 A1* | 12/2014 | Anderson ........... G06F 9/45533 718/1 |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019706 A1 | 1/2015 | Raghunathan et al. |
| 2015/0019707 A1 | 1/2015 | Raghunathan et al. |
| 2015/0020059 A1 | 1/2015 | Davis |
| 2016/0364229 A1 | 12/2016 | Higginson et al. |
| 2017/0118244 A1 | 4/2017 | Bai et al. |

FOREIGN PATENT DOCUMENTS

| | | |
|---|---|---|
| CN | 102656565 | 9/2012 |
| CN | 105308577 A | 2/2016 |
| CN | 105324756 A | 2/2016 |
| CN | 105324769 A | 2/2016 |
| CN | 105359102 A | 2/2016 |
| CN | 105359146 A | 2/2016 |
| CN | 105359147 A | 2/2016 |
| CN | 105393250 A | 3/2016 |
| CN | 105556515 | 5/2016 |
| CN | 105580032 | 5/2016 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| GB | 2468742 | 9/2010 |
| JP | 2006277153 | 10/2006 |
| WO | 9952047 | 10/1999 |
| WO | 0153949 | 7/2001 |

(56) References Cited

FOREIGN PATENT DOCUMENTS

| WO | 2015/005991 | 1/2015 |
|---|---|---|
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |
| WO | 2015/191119 | 12/2015 |

OTHER PUBLICATIONS

Leite et al., Migratool: Towards a Web-Based Spatial Database Migration Tool, IEEE Computer Society, Proceedings of the 16$^{th}$ International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.
U.S. Appl. No. 13/938,066, Non-Final Office Action dated Dec. 17, 2014.
International Application No. PCT/US2014/045226, International Search Report and Written Opinion dated Oct. 30, 2014, 10 pages.
International Application No. PCT/US2014/045240, International Search Report and Written Opinion dated Oct. 21, 2014, 10 pages.
International Application No. PCT/US2014/045289, International Search Report and Written Opinion dated Oct. 15, 2014, 9 pages.
International Application No. PCT/US2014/045721, International Search Report and Written Opinion dated Nov. 4, 2014, 12 pages.
International Application No. PCT/US2014/045804, International Search Report and Written Opinion dated Nov. 17, 2014, 12 pages.
U.S. Appl. No. 13/937,977, Non-Final Office Action dated Aug. 12, 2014, 28 pages.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
International Application No. PCT/US2014/040486, International Search Report and Written Opinion dated Sep. 29, 2014, 11 pages.
International Application No. PCT/US2014/040692, International Search Report and Written Opinion dated Oct. 8, 2014, 8 pages.
International Application No. PCT/US2014/045247, International Search Report and Written Opinion dated Sep. 3, 2014, 8 pages.
International Application No. PCT/US2014/045282, International Search Report and Written Opinion dated Sep. 18, 2014, 12 pages.
U.S. Appl. No. 13/937,977, Final Office Action dated Feb. 26, 2015, 30 pages.
U.S. Appl. No. 13/938,066, Notice of Allowance dated Apr. 29, 2015, 15 pages.
U.S. Appl. No. 13/937,344, Non-Final Office Action dated Sep. 24, 2015, 11 pages.
U.S. Appl. No. 13/937,483, Non-Final Office Action dated Sep. 25, 2015, 13 pages.
U.S. Appl. No. 13/937,977, Non-Final Office Action dated Aug. 19, 2015, 34 pages.
U.S. Appl. No. 13/938,066, Corrected Notice of Allowability dated Jun. 2, 2015, 2 pages.
International Application No. PCT/US2014/040486, Written Opinion dated Jun. 17, 2015, 7 pages.
International Application No. PCT/US2014/040692, Written Opinion dated Jul. 16, 2015, 7 pages.
U.S. Appl. No. 13/937,868, Non-Final Office Action dated Nov. 4, 2015, 18 pages.
U.S. Appl. No. 13/937,545, Non-Final Office Action dated Nov. 10, 2015, 19 pages.
Baysal, et al., "A Bug You Like: A Framework for Automated Assignment of Bugs", 2009.
U.S. Appl. No. 13/937,344, Final Office Action dated Feb. 11, 2016, all pages.
U.S. Appl. No. 13/937,486, Non-Final Office Action dated Jan. 11, 2016, all pages.
U.S. Appl. No. 13/937,868, Final Office Action dated Apr. 22, 2016, all pages.
U.S. Appl. No. 13/937,483, Final Office Action dated Feb. 26, 2016, all pages.
International Preliminary Report on Patentability of PCT/US2014/045247, dated Jan. 21, 2016, all pages.
International Preliminary Report on Patentability of PCT/US2014/045804, dated Jan. 21, 2016, all pages.
International Preliminary Report on Patentability of PCT/US2014/045721, dated Jan. 21, 2016, all pages.
International Preliminary Report on Patentability of PCT/US2014/045282, dated Jan. 21, 2016, all pages.
International Preliminary Report on Patentability of PCT/US2014/045289, dated Jan. 21, 2016, all pages.
International Preliminary Report on Patentability of PCT/US2014/045240, dated Jan. 21, 2016, all pages.
Notification of Transmittal of the International Preliminary Report on Patentability of PCT/US2014/040486, dated Oct. 1, 2015, all pages.
Notification of Transmittal of the International Preliminary Report on Patentability of PCT/US2014/040692, dated Oct. 8, 2015, all pages.
International Preliminary Report on Patentability of PCT/US2014/045226, dated Jan. 21, 2016, all pages.
U.S. Appl. No. 13/937,344, Corrected Notice of Allowability dated Sep. 15, 2016, 2 pages.
U.S. Appl. No. 13/937,977, Corrected Notice of Allowability dated Jul. 18, 2016, 2 pages.
U.S. Appl. No. 13/937,344, Notice of Allowance dated May 4, 2016, 11 pages.
U.S. Appl. No. 13/937,344, Notice of Allowance dated Jun. 6, 2016, 5 pages.
U.S. Appl. No. 13/937,483, Advisory Action dated May 12, 2016, 3 pages.
U.S. Appl. No. 13/937,483, Non-Final Office Action dated Aug. 12, 2016, 12 pages.
U.S. Appl. No. 13/937,486, Final Office Action dated Jul. 28, 2016, 18 pages.
U.S. Appl. No. 13/937,545, Final Office Action dated May 13, 2016, 20 pages.
U.S. Appl. No. 13/937,885, Non-Final Office Action dated Aug. 18, 2016, 30 pages.
U.S. Appl. No. 13/937,977, Notice of Allowance dated Mar. 16, 2016, 18 pages.
U.S. Appl. No. 13/937,988, Non-Final Office Action dated Sep. 1, 2016, 9 pages.
U.S. Appl. No. 13/938,061, Non-Final Office Action dated Aug. 18, 2016, 27 pages.
To, et al. "Best Practices for Database Consolidation on Exadata Database Machine", Oracle White Paper, Oracle, 2011, 29 pages.
Vengurlekar, et al. "Best Practices for Database Consolidation in Private Clouds", Oracle White Pages, Oracle, Mar. 2012, 20 pages.
U.S. Appl. No. 13/937,344, Notice of Allowance dated Oct. 11, 2016, 2 pages.
U.S. Appl. No. 13/937,483, Notice of Allowability dated May 3, 2017, 5 pages.
U.S. Appl. No. 13/937,483, Notice of Allowance dated Jan. 20, 2017, 8 pages.
U.S. Appl. No. 13/937,486, Non-Final Office Action dated Nov. 4, 2016, 20 pages.
U.S. Appl. No. 13/937,545, Non-Final Office Action dated Feb. 7, 2017, 19 pages.

(56) References Cited

OTHER PUBLICATIONS

U.S. Appl. No. 13/937,868, Non-Final Office Action dated Apr. 5, 2017, 23 pages.
U.S. Appl. No. 13/937,988, Notice of Allowance dated Apr. 27, 2017, 8 pages.
U.S. Appl. No. 13/938,061, Final Office Action dated Mar. 23, 2017, 29 pages.
U.S. Appl. No. 13/937,885, Final Office Action dated May 19, 2017, 22 pages.
Chinese Application No. 201480035255.X, Office Action dated Feb. 27, 2017, 11 pages (5 pages for the original document and 6 pages for the English translation).
Chinese Application No. 201480035257.9, Office Action dated Apr. 6, 2017, 10 pages (5 pages for the original document and 5 pages for the English translation).
European Application No. 14745014.2, Office Action dated Jan. 18, 2017, 8 pages.
European Application No. 14745014.2, Office Action dated May 2, 2017, 9 pages.
Wilton, Jeremiah: "A look at Real Application Testing from a customer's perspective", Jan. 1, 2007 (Jan. 1, 2007), XP055357904, Retrieved from the Internet: URL:http://www.oracle.com/technetwork/oem/grid-control/overview/ratcust-perspectives-white-paper-o-132919.pdf [retrieved on Mar. 23, 2017].
U.S. Appl. No. 13/937,868, Final Office Action dated Oct. 27, 2017, 25 pages.
Chinese Application No. 201480035257.9, Notice of Decision to Grant dated Oct. 11, 2017, 4 pages.
Chinese Application No. 201480035255.X, Notice of Decision to Grant dated Aug. 29, 2017, 4 pages.
Chinese Application No. CN201480035259.8, Office Action dated Nov. 14, 2017, 17 pages (10 pages for original, 7 pages for translation).
U.S. Appl. No. 13/938,066, Nov. 6, 2014, No Office Action issued yet.
U.S. Appl. No. 13/938,066, filed Jul. 9, 2013 now U.S. Pat. No. 9,098,364 issued Aug. 4, 2015.
U.S. Appl. No. 13/937,977, filed Jul. 9, 2013.
U.S. Appl. No. 13/938,061, Oct. 21 2015, No Office Action issued yet.
U.S. Appl. No. 13/937,868, Oct. 21, 2015, No Office Action issued yet.
U.S. Appl. No. 13/937,977, Aug. 12, 2014, Non-Final Office Action.
U.S. Appl. No. 13/937,977, Feb. 26, 2015, Final Office Action.
U.S. Appl. No. 13/937,977, Aug. 19, 2015, Non-Final Office Action.
U.S. Appl. No. 13/937,988, Oct. 21, 2015, No Office Action issued yet.
U.S. Appl. No. 13/937,545, Nov. 6, 2014, No Office Action issued yet.
U.S. Appl. No. 13/937,486, Nov. 6, 2014, No Office Action issued yet.
U.S. Appl. No. 13/937,885, Nov. 6, 2014, No Office Action issued yet.
U.S. Appl. No. 13/938,061, Nov. 6, 2014, No Office Action issued yet.
U.S. Appl. No. 13/937,344, Nov. 6, 2014, No Office Action issued yet.
U.S. Appl. No. 13/937,483, Nov. 6, 2014, No Office Action issued yet.
U.S. Appl. No. 13/937,988, Nov. 6, 2014, No Office Action issued yet.
U.S. Appl. No. 13/938,061, filed Jul. 9, 2013.
U.S. Appl. No. 13/938,066, filed Jul. 9, 2013, now U.S. Pat. No. 9,098,364 issued Aug. 4, 2015.
U.S. Appl. No. 13/937,885, filed Jul. 9, 2013.
U.S. Appl. No. 13/937,868, filed Jul. 9, 2013.
U.S. Appl. No. 13/937,344, filed Jul. 9, 2013.
U.S. Appl. No. 13/937,483, filed Jul. 9, 2013.
U.S. Appl. No. 13/937,988, filed Jul. 9, 2013.
U.S. Appl. No. 13/937,545, filed Jul. 9, 2013.
U.S. Appl. No. 13/937,486, filed Jul. 9, 2013.
U.S. Appl. No. 13/938,061, Dec. 3, 2015, No Office Action issued yet.
U.S. Appl. No. 13/938,066, Dec. 17, 2014, Non-Final Office Action.
U.S. Appl. No. 13/938,066, Apr. 29, 2015, Notice of Allowance.
U.S. Appl. No. 13/938,066, Jun. 2, 2015, Corrected Notice of Allowability.
U.S. Appl. No. 13/937,885, Dec. 3, 2015, No Office Action issued yet.
U.S. Appl. No. 13/937,868, Nov. 4, 2015, Non-Final Office Action.
U.S. Appl. No. 13/937,344, Sep. 24, 2015, Non-Final Office Action.
U.S. Appl. No. 13/937,483, Sep. 25, 2015, Non-Final Office Action.
U.S. Appl. No. 13/937,988, Dec. 3, 2015, No Office Action issued yet.
U.S. Appl. No. 13/937,545, Nov. 10, 2015, Non-Final Office Action.
U.S. Appl. No. 13/937,486, Dec. 3, 2015, No Office Action issued yet.
U.S. Appl. No. 13/937,486, Notice of Allowance dated Jun. 16, 2017, 5 pages.
U.S. Appl. No. 13/937,545, Notice of Allowance dated Jun. 15, 2017, 10 pages.
U.S. Appl. No. 13/938,061, Advisory Action dated Jul. 26, 2017, 6 pages.
International Application No. PCT/US2017/032620, International Search Report and Written Opinion dated Jul. 28, 2017, 15 pages.
U.S. Appl. No. 13/937,868, Notice of Allowance dated Feb. 8, 2018, 10 pages.
U.S. Appl. No. 15/789,049, Non-Final Office Action dated Feb. 2, 2018, 14 pages.

\* cited by examiner

FIG. 9

ADVANCED CUSTOMER SUPPORT SERVICES—ADVANCED SUPPORT CLOUD PORTAL

CROSS-REFERENCES TO RELATED APPLICATIONS

The present application is related to the following co-pending and commonly assigned U.S. patent applications: U.S. patent application Ser. No. 13/937,977, filed Jul. 9, 2013 by Higginson and entitled "METHOD AND SYSTEM FOR REDUCING INSTABILITY WHEN UPGRADING SOFTWARE;" U.S. patent application Ser. No. 13/938,061, filed Jul. 9, 2013 by Davis and entitled "CONSOLIDATION PLANNING SERVICE FOR SYSTEMS MIGRATION;" U.S. patent application Ser. No. 13/938,066, filed Jul. 9, 2013 by Davis and entitled "MIGRATION SERVICES FOR SYSTEMS;" U.S. patent application Ser. No. 13/937,885, filed Jul. 9, 2013 by Higginson and entitled "DATABASE MODELING AND ANALYSIS;" U.S. patent application Ser. No. 13/937,868, filed Jul. 9, 2013 by Higginson and entitled "AUTOMATED DATABASE MIGRATION ARCHITECTURE;" U.S. patent application Ser. No. 13/937,344, filed Jul. 9, 2013 by Raghunathan et al. and entitled "CLOUD SERVICES LOAD TESTING AND ANALYSIS;" U.S. patent application Ser. No. 13/937,483, filed Jul. 9, 2013 by Raghunathan et al. and entitled "CLOUD SERVICES PERFORMANCE TUNING AND BENCHMARKING;" U.S. patent application Ser. No. 13/937,988, filed Jul. 9, 2013 by Buehne et al. and entitled "SOLUTION TO GENERATE A SCRIPTSET FOR AN AUTOMATED DATABASE MIGRATION;" U.S. patent application Ser. No. 13/937,545, filed Jul. 9, 2013 by Buehne et al. and entitled "ONLINE DATABASE MIGRATION;" and U.S. patent application Ser. No. 13/937,486, filed Jul. 9, 2013 by Buehne et al. and entitled "DYNAMIC MIGRATION SCRIPT MANAGEMENT." The entire disclosure of the above listed applications are incorporated by reference into this application in their entirety and for all purposes.

BACKGROUND OF THE INVENTION

The present invention is directed to technology for accessing and managing networked resources and services using a common platform.

Modern computer systems are very complex, comprised of numerous components. Managing the systems, diagnosing problems, updating software, and installing new components may therefore be a very involved and complicated task. As a result, system administrator may spend considerable time determining problems, upgrading software, and installing new components. In many cases, specialists or specially trained technicians and administrators may be needed on site to perform the more complicated and specialized tasks.

The necessity to use specially trained technicians and administrators may increase costs and/or increase delays and uncertainty of maintaining and operating the systems. It may often take days or even weeks for a technician or administrator trained to be available to come to a specific site to upgrade software or diagnose a problem, for example. The cost of travel, time, and time investment for the technician or administrator to understand the system and components before the work may begin may further add to the time delay and costs.

Therefore what is needed are improved methods and systems for providing a platform for planning, building, testing, managing, and optimizing services for computer systems.

BRIEF SUMMARY OF THE INVENTION

Tasks and services associated with computer systems may be simplified and streamlined with a platform architecture that supports remote administration, development, and deployment of services. A system may be configured with a support cloud platform to allow automation of tasks and services and the reuse of components. The platform may generate, store, deploy, execute, and monitor services through their complete life cycle. Services may be designed, made available for deployment, deployed to a customer, executed and monitored using the platform. Embodiments described herein allow an efficient and consistent design and development of services by leveraging a standard methodology and a standard platform. The platform enables the more efficient design, development and release of remote and automated services.

In some embodiments, a system for deployment and monitoring of a service for a data center includes a gateway, the gateway may be local to the data center and configured to receive a service for deployment on the data center. The gateway may include a delivery component configured to receive and deploy the service to a target system on the data center. The gateway may also include a receptor for capturing and managing the execution of the service and an event handler for capturing and sorting output data during the execution of the service. The system may further include a portal that is configured to communicate with the gateway of the data center via a network. The portal may be remote from the data center and configured to transmit the service to the gateway, the portal may be configured to receive and analyze the output data from the gateway. In embodiments the portal may include a service module used to configure and transmit the service to the gateway and receive the output data from the gateway pertaining to the service. The portal may also include a business intelligence module configured to processes and analyze the output data from the service received from the gateway and generate an output data summary. In embodiments the portal may also include a user interface that is accessible from the data center via the network and configurable to generate an indication of a status of the service and the output data summary.

In some embodiments the portal may further comprises an account management module that may control access to the portal. In other embodiments the service module may be automatically initialized based on the type of service selected for deployment. The system may further include a commerce module that has a user interface for selecting and making purchases of services. In some embodiments the system may further include a repository module on the portal, the repository module may store the output data and the output data may be accessible by other services. In some embodiments the system may make recommendations for other services based at least in part on the received output data.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9 illustrated an embodiment of a graphical user interface of the portal.

DETAILED DESCRIPTION OF THE INVENTION

Figure 1:
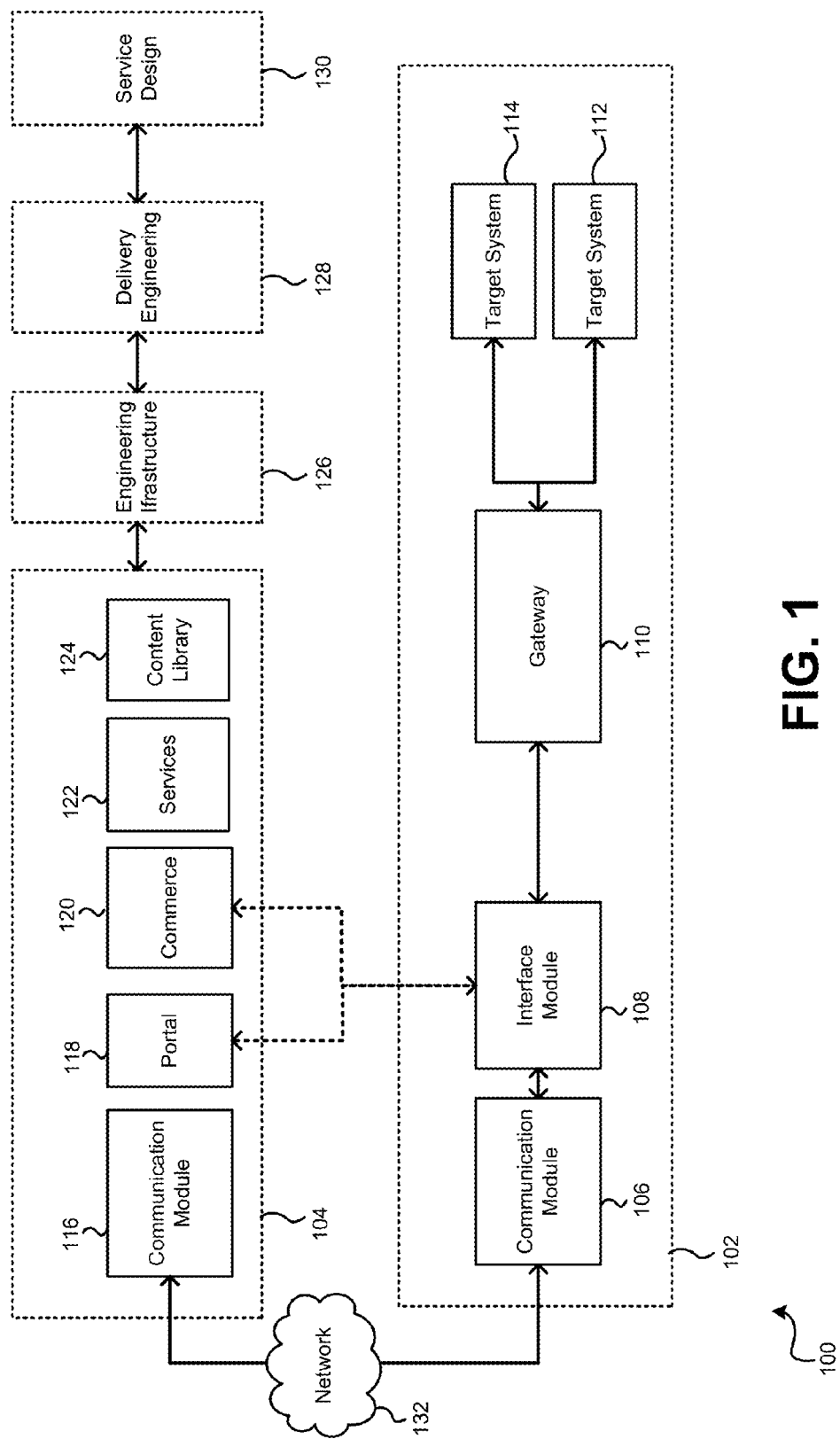
FIG. 1 illustrates an embodiment of a support platform system.

A computer system may require administration such as periodic maintenance, software upgrades, migration, service deployment, diagnostics, performance tuning, and/or other services. Some organizations and businesses that use database systems may employ system administrators or other personnel to perform some of these tasks. In some cases some tasks may require special skills or knowledge outside the scope of a typical administrator and may require an outside expert or personnel to accomplish the tasks. In some cases, the administration tasks may be performed by an outside entity or engineer as a service to the organization or business.

Traditionally, services are provided based on multiple engagements with customer contacts, and creating a contract and service delivery plan tailored to the customer's needs. Service delivery itself is traditionally provided onsite and based on the specific knowledge and/or software the service engineer has access to and may differ from engineer to engineer. The costs associated with provided the service using the traditional methods may vary widely from service to service and customer to customer. A customer in a remote location may pay much more for the same service than a customer in a city location due to the additional costs and time required to travel to the remote site, for example.

Many of the administrative tasks and services associated with database systems may be simplified and streamlined with a platform architecture that supports remote administration, development, and deployment of services. A system may be configured with a support cloud platform to allow automation of tasks and services and the reuse of components. The platform may be used to generate, store, deploy, execute, and track services through their complete life cycle. Services may be designed, made available for deployment, deployed to a customer, executed, and monitored using the platform.

The platform may include a remote portal from which customers, administrators, and service provider may monitor, deploy, and analyze services for a remote customer's target system. The service execution may be performed and controlled remotely and at least in part automatically. Services may be controlled and deployed to the target system using the portal eliminating the need for an administrator to be local to the target system. Likewise, the portal provides a rich set of tools for all customers and depends less on the individual skill and knowledge of the particular engineer performing service.

The support cloud platform may facilitate performing services in at least a partially automated and remote manner and may result in a number of important benefits to the service provider and the customer. For example, the platform may reduce the time to market for new services. A unified platform which enables services to be built using common features/components may reduce the time to develop and test the new service. Automation and consistency may allow the service provider to create a standard pricing and contracting model that can be re-used for new services. Sales and contracting time for new services may be reduced due the simplified pricing model. A service provider may create a modular service portfolio and can deliver services discretely or as part of a solution. The platform may reduce the cost of developing and delivering services. A common platform for all services may enable service designers and developers to leverage common features. As developers create more automated services, this reduces/eliminates the need for manual input, thus reducing the cost of delivering a service. The platform may provide for an improvement in global service quality and consistency since services may be designed, developed and delivered through the platform in at least a partially automated manner. The platform may also expand the market for services enabling services to be easily sold and delivered.

In embodiments the support cloud platform may be used for the development and deployment of services including assessment services assessing infrastructure, business data, and/or transactions of the database system. The services may leverage analytics to identify key indicators, patterns and/or trends. Services may install, monitor and/or perform setup of new software and/or hardware. Services may install and implement gold images or perform migrations, upgrades, and consolidations. In addition services may include provisioning, cloning, backup and recovery, install, setup, test, monitoring, recovery and restore, metering, chargeback, testing, load testing, functional testing, performance management and tuning, and/or the like. In some embodiments the services may leverage one service as a basis for other services. Details of some of the services may be found in the following co-pending and commonly assigned U.S. patent applications: U.S. patent application Ser. No. 13/937,977, filed Jul. 9, 2013 by Higginson and entitled "METHOD AND SYSTEM FOR REDUCING INSTABILITY WHEN UPGRADING SOFTWARE;" U.S. patent application Ser. No. 13/938,061, filed Jul. 9, 2013 by Davis and entitled "ACS LIFECYCLE SUPPORT SERVICES—CONSOLIDATION PLANNING SERVICE FOR SYSTEMS;" U.S. patent application Ser. No. 13/938,066, filed Jul. 9, 2013 by Davis and entitled "ACS LIFECYCLE SUPPORT SERVICES—MIGRATION FOR SYSTEMS;" U.S. patent application Ser. No. 13/937,885, filed Jul. 9, 2013 by Higginson and entitled "DATABASE MODELING AND ANALYSIS;" U.S. patent application Ser. No. 13/937,868, filed Jul. 9, 2013 by Higginson and entitled "AUTOMATED DATABASE MIGRATION ARCHITECTURE;" U.S. patent application Ser. No. 13/937,344, filed Jul. 9, 2013 by Raghunathan et al. and entitled "CLOUD SERVICES LOAD TESTING AND ANALYSIS;" U.S. patent application Ser. No. 13/937,483, filed Jul. 9, 2013 by Raghunathan et al. and entitled "CLOUD SERVICES PERFORMANCE TUNING AND BENCHMARKING;" U.S. patent application Ser. No. 13/937,988, filed Jul. 9, 2013 by Buehne et al. and entitled "SOLUTION TO GENERATE A SCRIPTSET FOR AN AUTOMATED DATABASE MIGRATION;" U.S. patent application Ser. No. 13/937,545, filed Jul. 9, 2013 by Buehne et al. and entitled "ONLINE DATABASE MIGRATION;" and U.S. patent application Ser. No. 13/937,486, filed Jul. 9, 2013 by Buehne et al. and entitled "DYNAMIC MIGRATION SCRIPT MANAGEMENT." The entire disclosure of the above listed applications are incorporated by reference into this application in their entirety and for all purposes.

FIG. 1 illustrates an embodiment of a support cloud platform 100. The platform may be used to through the life cycle of a service. Services may be designed, made available for deployment, deployed to a customer, executed, and monitored using the platform. The customer data center 102 may include one or more target systems 112, 114 that may be the target of the services provided by the platform. The target systems may be servers, computers, rack systems, and the like that run or execute a database and/or other software used by a customer. A target system may be a hardware or software entity that can have service delivered and may be a host, database, web logic server, and/or the like. In the customer data center 102, the target systems 112, 114 may be managed by an administrator local to the data center 102. The administrator may have physical access to the target systems 112, 114. The cloud platform 100, may provide for the administration and other services of the target systems via a remote interface from a remote location. A gateway 110, located on the data center 102 provides remote access to the data center 102 and one or more target systems 112, 114. The gateway 110 may be a hardware or virtual software appliance installed at the customer data center. The gateway 110 connects to a production cloud 104 of a service provider via a secure connection using a communication module 106 over a network 132. The gateway 110 may optionally have an interface module 108 allowing control of the interactions of gateway 110 to the production cloud 104 of the service provider.

Services may be generated and developed using a common service development framework of the platform. The common service development framework may include a service design 130, delivery engineering 128, and engineering infrastructure 126 modules. The common service development framework may leverage common components that can be used throughout the delivery process (manual and/or automated), and may enable the efficient design, development, testing and release of a service. The common service development framework of the platform enables at least partial automation of the development of a service.

The platform enables delivery engineers to automate the service they are developing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the platform, services may be designed and implemented in one or more central locations. A centralized service design and development platform enables a hierarchical and structured service design with reusable components and modules. The development of a service may be, at least in part, automated since a large portion of the components of a service may be assembled from existing reusable components.

After the services are designed, developed, and tested, they may be stored at the production cloud 104. The production cloud 104 may include a library of services 122 and a content library 124. The services and content may be deployed from the production cloud 104 to one or more target systems 112, 114 at a customer data center 102. The deployment, monitoring, and the like of services may be arranged with interaction from the portal 118 and commerce module 120 at the production cloud 104 and the gateway 110 and an interface module 108 at the customer data center 102 via the communication modules 106, 116. The design, deployment, execution, and monitoring of the service may be performed remotely from production cloud without the need of an administrator or engineer at the customer's data center 102. The portal 118 of the platform may provide for remote control and administration of services, control of deployment, and analysis of results.

The platform of FIG. 1 may be used to develop, deploy and manage, services for the customer data center 102 and target systems 112, 114. A gateway 110 has access to the target systems 112, 114. Services, in the forms of software, scripts, functions, and the like, may be downloaded from the production cloud 104. The commerce module 120 and the portal for the production cloud 104 provide an interface, selection tools, monitoring tools, for selecting the services, and monitoring the services to be deployed in the customer data center 102. An administrator at the customer data center 102 may view, select, execute, and monitor the services using the portal 118 and commerce module 120. The customer may access the portal 118 and commerce module 120 using interface module 108 at the customer data center 102. The interface module may have a direct or an indirect access to the portal 118 and the commerce module via the communication module 106. For example, using the platform 100, a service may be selected using the commerce module 120. The commerce module 120 may be accessed using the interface module 108. Once a service is selected and configured for the target systems 112, 114, the service may be deployed from the production cloud 104 to the customer data center 102 via the gateway 110. The gateway may deploy the service on to the target systems. The gateway 110 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 118.

In some embodiments a customer may use the commerce module 120 to make purchases of services without having a gateway on the customer center. The commerce module may have an interface accessible via a network from a web browser, application, and the like. After the customer purchases or selects services the customer may be instructed or authorized to install or deploy a gateway on the customer's data center to deploy, execute, and monitor the service.

Figure 2:
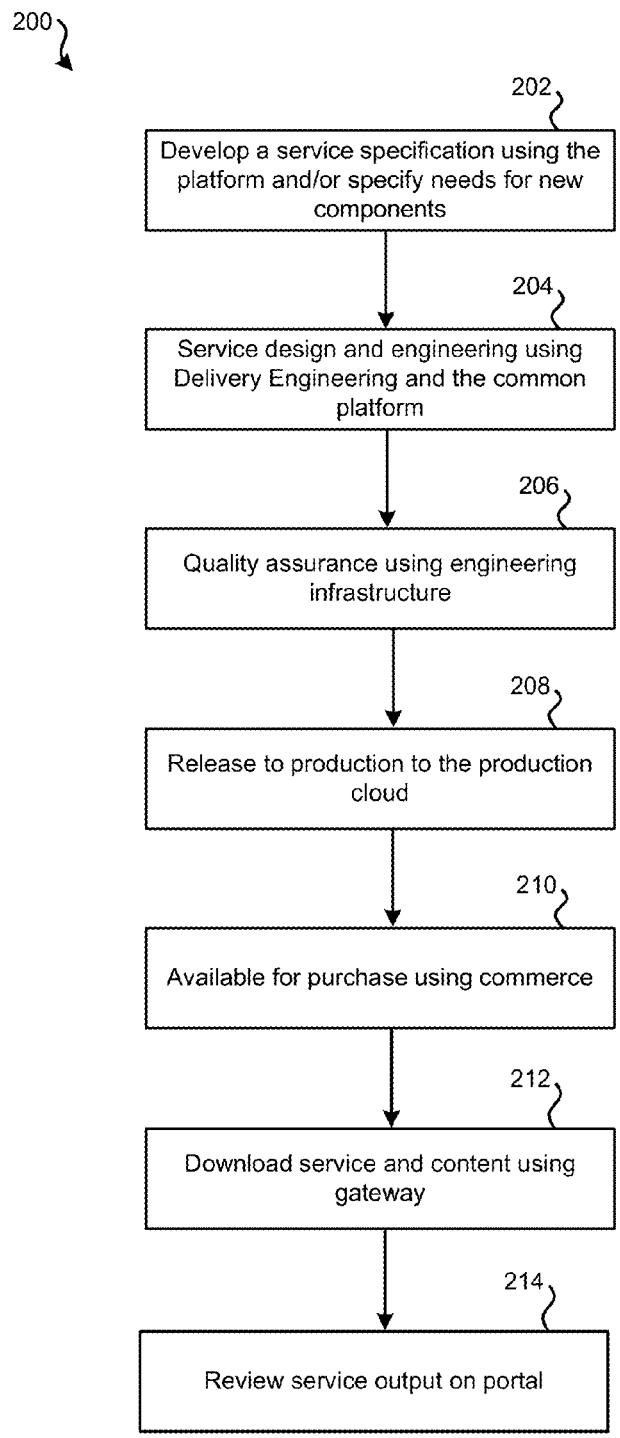
FIG. 2 illustrates a flow diagram summarizing the life cycle of a service.

FIG. 2 shows a flow diagram showing a lifecycle of a service in the context of the platform from FIG. 1. A service begins its life cycle when a service specification is developed using the platform at block 202. The service specification may define the characteristics of the service, requirements, actions the service may take, data the service may monitor or collect the operating characteristics of the systems of the service and/or the like. The service specification may be developed, at least in part, based on the data received from the platform. Data about customer's target systems, usage, statistics, and the like may be received from the customer's data center via the gateway 110. The data may be used determine the specification of the service. For example, data received from the gateway regarding customer's target systems may indicate that a database on the system may be running on outdated software. A service for upgrading and migrating the database to the new software may be needed. Based on the data received from the gateway the specification for the service may be defined. The data received from the gateway may, for example, include the software versions, database types, sizes, information about the target systems, and the like. In some embodiments the life cycle may begin with a specification of the needs or requirements for new components. The components may be reusable modules, code, executable, data sets, and/or the like that may be used to build services, referenced by services, or used to support a service.

The service specification may be developed in the service design 130 module of the platform. The service design 130 module may include automated tools for analyzing data to determine the service specification. The service design may include input from a development team, management, customer, and/or the like.

Once the specification of the service is defined, the service may be designed in block 204 at the delivery engineering module 128 of the platform 100. The specification may be used by the delivery engineering module 128 to design, develop, and test the service from the specification. The delivery engineering module 128 may assemble one or more existing blocks of code, scripts, functions, and/or the like to implements the service described by the service specification. The delivery engineering 128 module may, at least in part, automatically change parameters for existing services to match the specification for a new service. For example, a database migration service may have many of the same common features independently of the characteristics of the migration. A service for a specific migration may use an existing migration service and disable some unnecessary features, such as data compression, for example. Delivery engineering 128 may in some embodiments comprise of one or more developers who write scripts, code, and the like to generate a program to implement the service. In some embodiments delivery engineering may be an automated system that implements the service from the specification.

The developed service may be passed on to the engineering infrastructure module 126 for quality assurance in block 206. During quality assurance, the service may be tested and content for each service may be developed. The engineering infrastructure may employ a test farm of servers and sample target system that may mirror the parameters, specifications, and characteristics of customer target systems. The test farm may be used to analyze and stress test the service in a rigorous and monitored manner. The service may further be analyzed and redeveloped into reusable components to allow other services to reuse the core functionality and functions developed for the service.

In block 208 the tested service may be passed on to production to the production cloud 104. In block 208 the service is formally released and is ready for a customer download to the customer gateway 110. At the same time, the service may be release to other channels such as marketing, sales, pricing and contracting sites, commerce channels, and the like. The service may be stored or made available at the services module 122.

The service may be made available for purchase at the commerce module 120 of the platform 100 in block 210. The commerce module may include a generated user interface (UI) that a customer may access via a network and a browser and/or the interface module 108 at the customer data center 102. A customer may use the commerce module 120 to search and browse for service offerings. The commerce module 120 may show the features, compatibility, price, and the like for the service and the specific customer. A customer may purchase, review and agree to contract terms for the service, request assistance, and/or the like using the commerce module 120. A service may be made purchased and immediately or after a period of validation made available for delivery and setup at the customer target systems. Validation may include authorization of the customer's target system, payment validation, and/or the like.

After purchase the service and/or content may be downloaded at block 212. After purchase a customer may be provided with access to the portal 118 to initiate service and/or content delivery. The portal may deploy a service and/or content package to the customer's gateway 110. The gateway may then install and/or execute the service and/or content on the target systems automatically. The execution and deployment may be controlled through the portal 118 which may be remote from the customer's data center 102. During and after the deployment and execution of the service and/or content, the gateway may transmit data to the portal regarding the execution of the service, data gathered by the service, status, and/or other data and metrics.

During and after the deployment a customer may access the portal 118 and review the service output in block 214. The portal 118 may provide a summary of the data gathered by the service and transmitted to the portal via the gateway 110. The portal may provide the customer with a full view of all service engagements with the service provider, and also may provide the customer with a deeper understanding of their systems & applications. The portal may comprise and interface and a back-end to facilitate functions of the portal 118 and interact with other parts of the platform 100.

Figure 3:
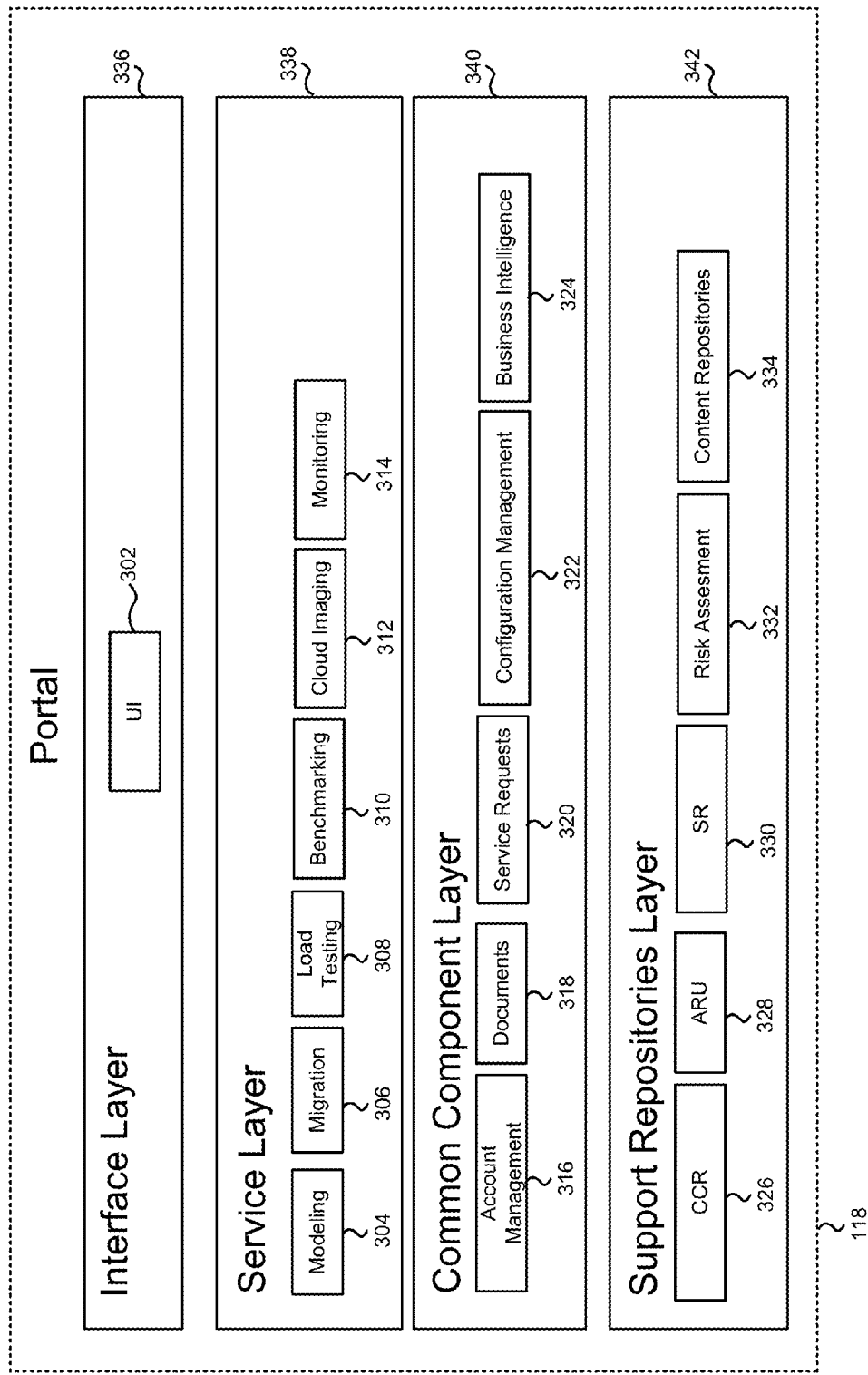
FIG. 3 illustrates a block diagram of the components of an embodiment of a portal.

FIG. 3 shows a block diagram of the structure of the portal 118. The portal 118 may be based on a layered architecture. The portal may be divided into four layers: the interface layer 336, service layer 338, common component layer 340, and a support repositories layer 342. These layers are responsible for the handling of service and customer information and the presentation and orchestration of services. The layers may be used to interface and communicate with the gateway 110, enable remote administrators to interact with data and gateway to deliver service, and/or enable customers to receive service via portal and collaborate with service provider.

The backend of the portal may include a support repositories layer 342. The layer 342 may be used to leverage various sources of data to enrich and or deliver services. The layer may include repositories or access to repositories that may include configuration, patch, SR information and data, and the like. In embodiments, the repositories may be used to store and access configuration, diagnostic, monitoring information. The information may be used, at least in part, to assess the status or performance of a customer's system or to decide or provide recommendations for services. For example, a repository may be used to store and collect configuration information about the product versions and data types of a database. The configuration information may be used to suggest or provide to the customer the appropriate service for migrating the database to a new version. The repositories may be used to provide a rich data pool for generating summaries, charts, metric, maps, and the like of the customer's system. The repositories may be used a central data store of information gathered from services that may be processed and summarized to the customer using the portal.

The backend of the portal may further include a common component layer 340. Elements of the layer 340 may include components that are used in support of services during and after deployment. Elements may include an account management module 316 that provides authentication and authorization and security to the portal and the service. The account management module may be used to manages the customer authentication (user name and password) and authorization (customer is entitled to access a service they have purchased on the portal). Customers may be provided access to the portal, and also granted access/entitlement to one or more services using the module. The layer 340 may further include a documents module 318 which provides the methods for managing documents using the portal. Customers and service providers may upload, view and/or edit documents to collaborate or outline service requirements, or service delivery. Furthermore the layer 340 includes a service request module 330 for managing the various requests and steps used in the delivery of a service. Customers and service providers may request services, report problems, track service requests using the functionality of the module. A configuration management module 322 may be used to manage the configurations associated with a customer and service engagements. The configuration management module may include a storage location for configuration information for all systems that are connected to the gateway. The configuration information may be used to make decisions during service execution. For example, the configuration information may be used to assess requirement for a migration service to determine which versions data types and the like require migration. A business intelligence module 324 may be used to identify high value information.

The service layer 338 of the portal 118 may include specific modules and functions required for each service. Each type of service may include defined workflow and logic, security, and/or the like. Each type of service may include a module for managing the special workflow, logic and other requirements for the service. Modules for modeling 304, migration 306, load testing 308, benchmarking 310, cloud imaging 312, monitoring 314 may be implemented in the layer 338. For example, the service layer module for a migration may include a workflow that first determines, via a pre-migration assessment, whether a database can be migrated, and then determines how that database is to be migrated. The workflow may then configure the migration component and executes the migration, and finally the workflow may execute a post-migration assessment to validate that the migration ran successfully.

Finally the interface layer 336 of the portal 118 provides an interface such as a graphical user interface 302 that may be used by the customer, service provider, and or administrator. The interface layer represents the presentation layer for the services. The user interface 302 of the interface layer 336 may be a responsive web design and, as such, may work on multiple devices (e.g.: desktop, phone, phablet, tablet). The UI of the portal may provide a common service interface for the services and/or content. The UI may represent and present available, installed, active, and/or like support cloud services in a consistent interface with a similar look and feel. Common user interface components may be used. Navigation methodology may be based on rich service summary reporting with drill-down for more detail. Services may be tightly coupled with customer configurations. Technical data required for service delivery (analysis, verification, reporting) may be collected automatically. Analytics may be used extensively to help reduce the information overload by creating 'easy to consume' dashboards and reports.

Figure 4:
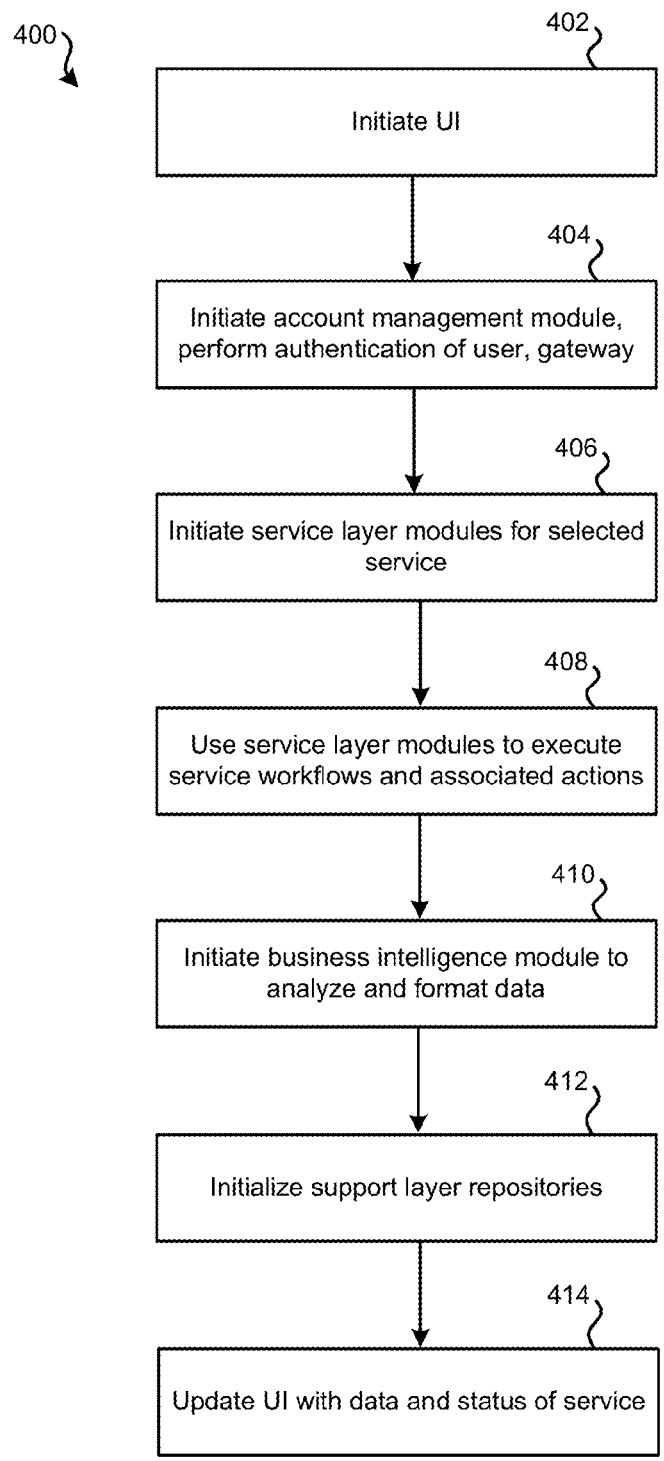
FIG. 4 illustrates a flow diagram depicting an embodiment of a process of interaction of portal modules.

FIG. 4 shows a flow diagram of a process 400 showing how the layers of the portal 118 may be initiated and interact during service deployment and monitoring of a service. Interaction with the portal may begin with an initialization of the UI 302 of the portal 118 at block 402. The UI 302 may be presented to the customer at a remote location. In block 404 the account management module 316 may be initiated. The account management module may authenticate the user, securely connect to the gateway of the customer data center and determine the available services at the gateway. The customer may choose to deploy or execute a service in block 406, and cause the initiation of the appropriate service layer 338 module. Each type of service may require particular module to deploy. The particular modules may setup the necessary environment for the deployment. For example a migration service may require initialization of the migration module 306. The migration module 306, may, for example, be configured to initiate execution of the service only specific times, such as when the target system is not used for example. This constraint may be different for different services types. The specific service layer modules may also be used to execute service workflow and associated actions. The modules may monitor the status and data for the service during execution in block 408, collect date, execute jobs, send messages to the gateway, and/or the like. The data and status of the service may be analyzed, processed, and formatted by the business intelligence module 324 in block 410. In some cases, services may require access to support repositories layer 342 during or after execution in block 412. In block 414 the UI 302 may be updated with the new status of the service and/or any data received during the execution of the service.

Figure 5:
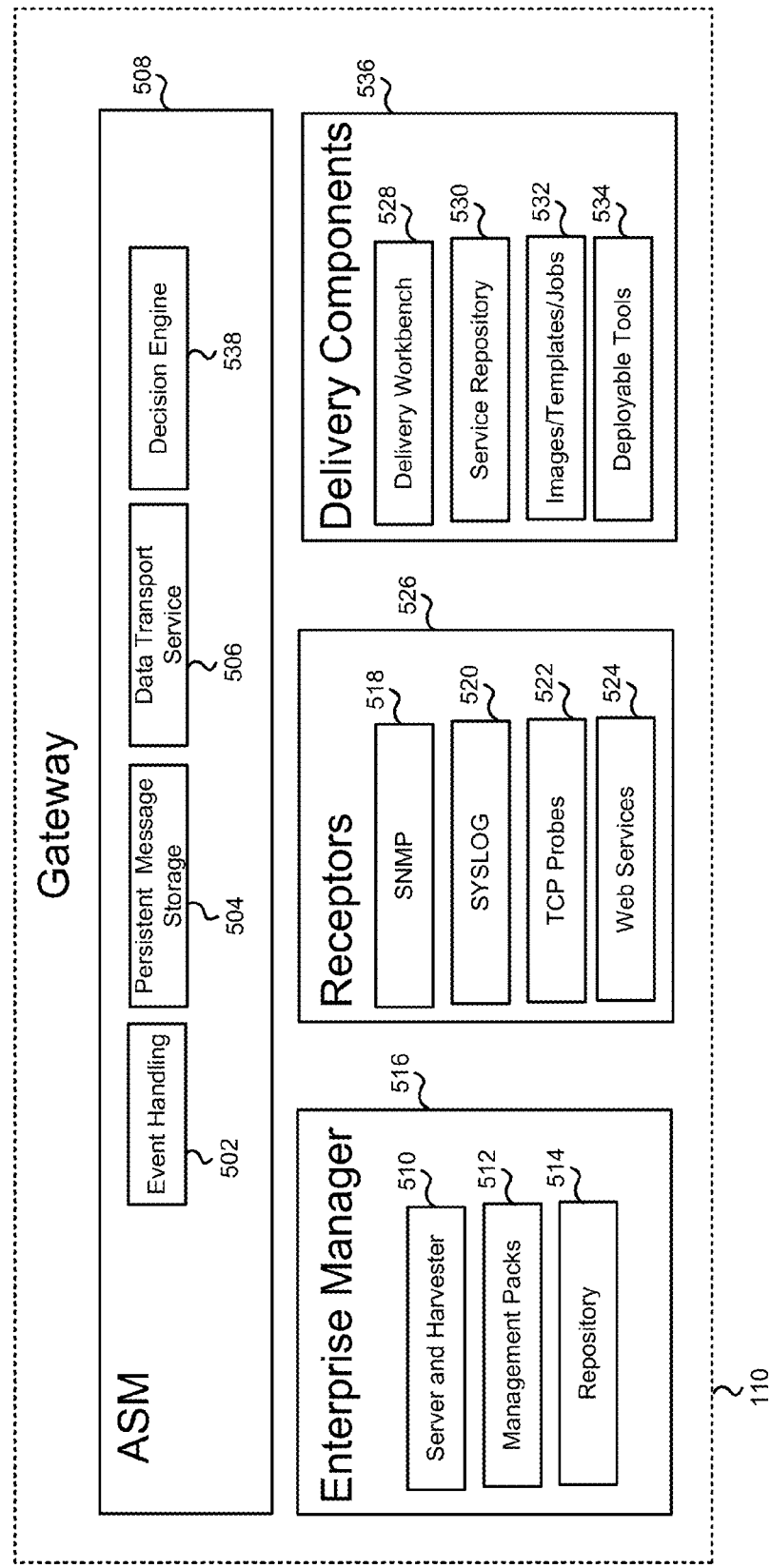
FIG. 5 illustrates a block diagram of the components of an embodiment of a portal.

FIG. 5 shows a block diagram of the structure of the gateway 110 of the platform. The gateway may be hardware or virtual software appliance containing tools required to deliver service to customer's target system. It is installed on the customer site, and has access to the target system for which the customer wants service provided. The gateway may be based on a layered architecture. The gateway may be divided into four layers and components: automated service manager (ASM) layer 508, enterprise manager components 516, receptors 526, and delivery components 536. Some aspects of embodiments of the gateway have also been described in U.S. patent application Ser. No. 12/408,170 filed on Mar. 20, 2009 entitled "METHOD AND SYSTEM FOR TRANSPORTING TELEMETRY DATA ACROSS A NETWORK," U.S. patent application Ser. No. 11/151,645 filed on Jun. 14, 2005 entitled "METHOD AND SYSTEM FOR RELOCATING AND USING ENTERPRISE MANAGEMENT TOOLS IN A SERVICE PROVIDER MODEL," and U.S. patent application Ser. No. 11/151,646 filed on Jun. 14, 2005 entitled "METHOD AND SYSTEM FOR REMOTE MANAGEMENT OF CUSTOMER SERVERS" herein incorporated by reference in its entirety and for all purposes.

The ASM layer 508 includes modules that handle events created from monitoring systems/targets. The ASM layer 508 may include modules for event handling 502, message storage 504, data transport service 506, and a decision engine 538. In the layer, messages and/or events corresponding to services deployed in target systems may be stored, filtered and correlated. Modules in the layer may include a decision engine that may take action based on specific messages or messages events using the decision engine 538. For example, the ASM layer may receive a message indicating unusually high processor utilization. The high processor utilization may signal a problem with the system such as a runaway process or a security attack. The decision engine 538 may analyze the information of the message and depending on the system characteristics and the processor utilization initiate an action. The decision engine may, for example, deployment of a diagnostics service to pinpoint a specific cause of the high utilization of the processor. Messages pertaining to database performance, system activity, hardware activity, and/or the like may be utilized by the ASM layer 508.

The enterprise manager 516 components of the gateway 110 are used in service delivery and contains capabilities required for many services such as data collection, monitoring, job automation, provisioning, and the like etc. The enterprise manager may include server and harvester modules 510, management packs 512, and repositories 514.

In areas where the enterprise manager is not configured to provide monitoring and data collection the gateway may include other receptor components 526 that may monitor and collect data from other sources. For example, the receptors may include a SYSLOG 520 receptor for monitoring system logs of the target system. Likewise TCP Probes 522 may monitor network transmissions and the like. Other modules like a Simple Network Management Protocol (SNMP) module 518 and web service module 524 may be included. The SNMP module, for example, may be used to monitor and manage systems using an established communication protocol.

Delivery components 536 include modules that provide tools, scripts and content that enable delivery of services. The delivery components 536 may include a service workbench 528 which may provide for an interactive user interface that enables remote service provider to execute tasks necessary for service delivery. The tasks may include viewing reports, executing specific tasks/jobs, validating actions, and/or the like. A service repository 530 may provide a local store for service specific data collected. The data may include a summary of data extracted from the enterprise manager repository 514. The service repository 530 may be used to enable service specific analysis and reporting on the gateway. The service repository 530 may also be used as a staging area for summary data prior to transporting that data to the production cloud. An images/templates/jobs module 532 may provide for local storage of content that is used in the delivery of services. Also, deployable tools module 534 may provide storage for tools, scripts and executables.

Figure 6:
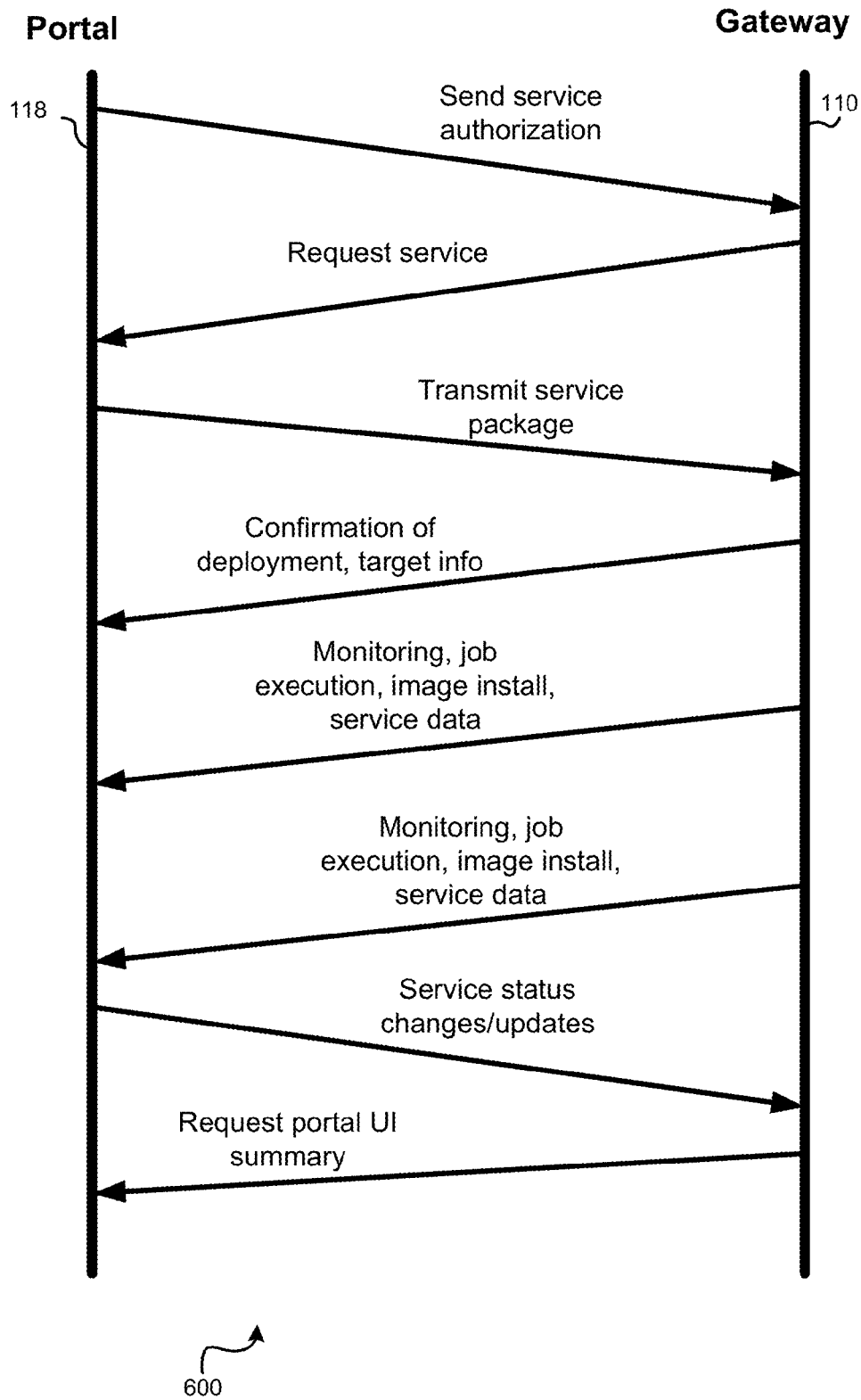
FIG. 6 illustrates an exemplary embodiment of a communication flow diagram between a portal and a gateway.

The components and layers of the gateway 110 and the portal 118 may be used to deploy services and data related to the services. FIG. 6 shows one example of a flow of a communication sequence for deploying and monitoring a service from the portal 118 to the gateway 110. After the customer purchases a service, the portal 118 may transmit to the gateway 110 a service authorization. The service authorization may include authentication tokens, passwords, access credentials, unlock codes, and/or the like that allow the gateway to request the service, validate its authenticity, and authorize its execution. The service authorization may be initiated from the account management module 316 of the portal 118. In the next step, the gateway 110 may request the service from the portal 118. The gateway may initiate the delivery components 536 to make the request. The request may be paired with the authentication information provided initially from the portal.

In the next exchange of information, the portal 118 may transmit the service to the gateway. The service may be received by the service repository 530 of the gateway 110. The service may be identified as a particular type of service and may be identified with specific functions, monitoring capabilities, or requirements. Based on the type of service the gateway 110 may initiate an appropriate module from the enterprise manager components 516 and/or the receptor components 526. The service may be deployed and execution may be initiated on the target systems of the customer data center 102. For example, a service may be designated as a migration service designed for migrating of a database from an obsolete software version to a new software version. The service may be stored in the service repository 530 and the enterprise components 516 related to migration service initiated. The enterprise components 516 related to migration may initiate execution of the service.

The gateway 110 may respond to the portal 118 with a confirmation of the receipt of the service, a confirmation of successful deployment to the target systems and any additional information or data related to the deployment status, parameters of deployment, configurations of the service and/or the like. In some embodiments the configuration of the service may not be known until diagnostic tools or initial execution of the service is initiated. The status and configuration information may be necessary to initiate or deploy other services to the gateway. For example, in the example of a migration service, the service may first execute an analysis script for determining the amount of data in the database, determine the complexity of the migration, and the like. The data may be transmitted to the portal. If for example, the scope of the migration is outside of the scope of the migration service a new service, designed to match the scope of the migration, may be transmitted to the gateway 110 for deployment on the target systems.

In the next step, the gateway 110 may transmit to the portal data related to monitoring, job execution, image install, status and the like data related to the service during the execution of the service. The data may be transmitted continuously, periodically, according to events, or according to a schedule. During the execution of the service events may be captured by the gateway by the event handling module 502 of the ASM layer 508. The events may generate status updates, messages, data, etc. The output of the events may be processed by the decision engine 538 of the gateway 110. The decision engine 538 may determine which outputs or data may be transmitted to the portal 118. The portal may process the received data and events using an appropriate service layer 338 module. For example, in the case of data and events received from a service performing migration the data may be serviced using a migration module 306. The data received at the portal 118 may be stored, analyzed, and made available to the customer via UI 302 of the portal 118. The received data, messages, and the like may be processed by the business intelligence module 324 of the portal 118 to summarize information and provide statistics relevant to the customer that may be displayed using the UI 302. For example, during the execution of a migration service, the gateway may transmit to the portal data related to the progress of the migration, problems found during the migration, exceptions, and/or the like.

Figure 7:
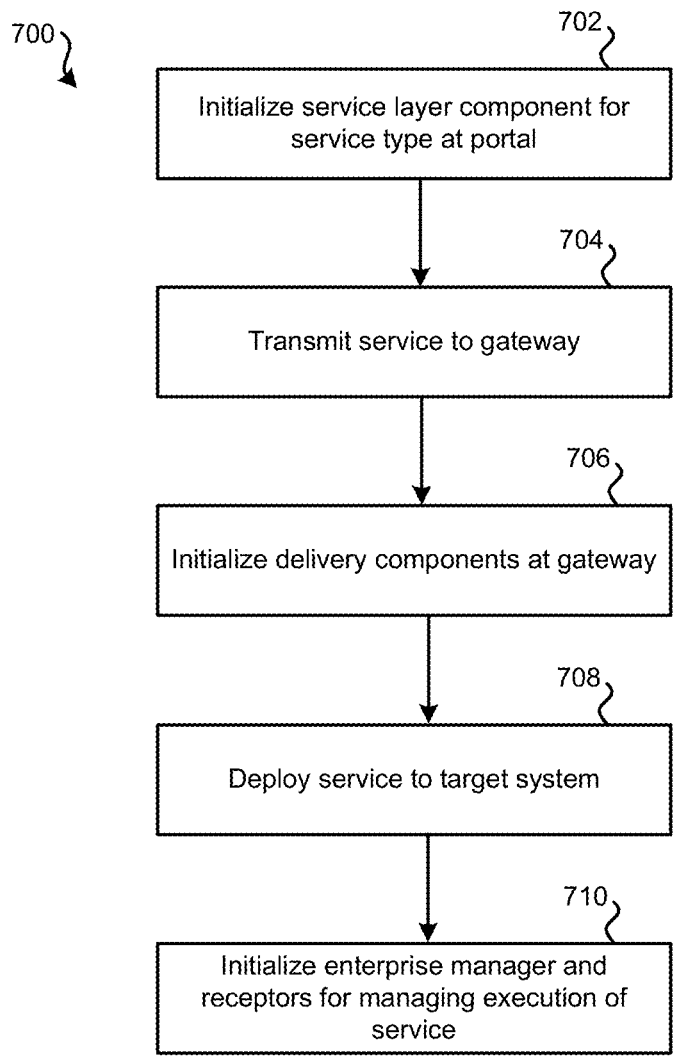
FIG. 7 illustrates a flow diagram depicting an embodiment of a process for deploying a service.

FIG. 7 shows another flow diagram for an embodiment of a process 700 for deploying a service using the portal 118 and gateway 110. In block 702 a service layer 338 module pertinent to the type of service being deployed may be initialized. A monitoring module may be initialized for a monitoring service, a migration module for a migration service and so on. Using the portal and the service layer 338 module the service may be transmitted to the gateway 110 in block 704. An appropriate delivery component for the service type may be initialized at the gateway 110 in block 706. In block 708 the gateway may deploy the service to the target system and initiate execution. In block 710, the gateway may initialize enterprise manager and/or other data receptors for managing the execution of the service and capturing data and events.

Figure 8:
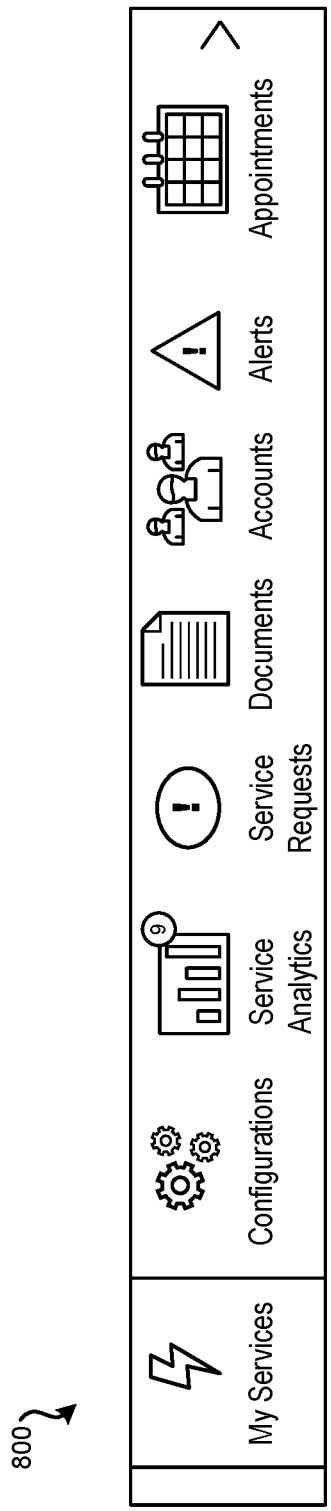
FIG. 8 illustrated an embodiment of a navigation header for a user interface of the portal.
Figure 9:
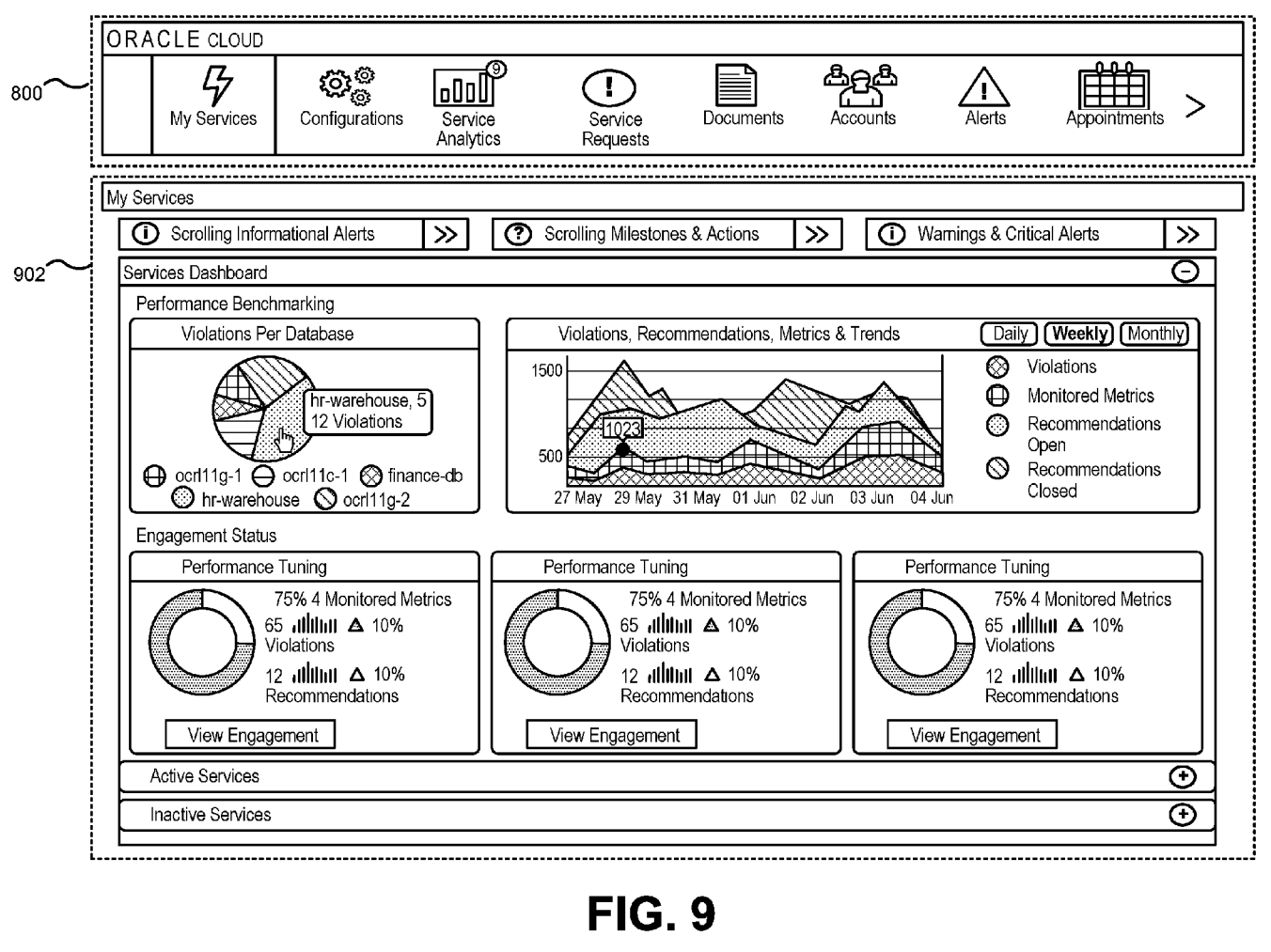

Examples of an embodiment of a user interface of the portal are shown in FIGS. 8-9. FIG. 8 shows a top level navigation header 800 of the portal UI. The top level navigation options provide the user with a number of options for navigation navigate. The UI of the portal may give the customer access to the functionalities of the portal modules and layers. The navigation header 800 may include option for viewing services in "My Services", configurations in "Configurations", service analytics in "Service Analytics", service requests in "Service Requests", documents in "Documents", account information in "Accounts", alerts in "Alerts", and appointments and scheduled services in "Appointments". Selecting, clicking, touching, and/or the like any of the options of the navigation header 800 may invoke or initiate one or more layers, modules, and the like to provide the user with additional information pertaining to the option selected. In some embodiments the information displayed when an option is selected may be generated in real time by the one or more layers and/or modules of the portal. In some embodiments, at least some of the information displayed when an option is selected in the navigation header 800 may be pre generated by one or more of the layers and/or modules of the portal and stored for display when the option is selected.

In embodiments, selecting the "My Services" option from the navigation header may provide information related to services that are available or deployed to the gateway for the customer. A service dashboard may be displayed that shows active services, inactive/complete services for example. An example embodiment of a snapshot of the UI with the "My Services" option selected in the navigation header 800 is shown in FIG. 9. The content section 902 of the UI 302 shows the details related to the services of the customer. The content section may typically include a combination of data tables, graphs, text, pictures, maps, and/or the like to display or summarize the information. In the example of FIG. 9 the content section 902 includes graphs a dashboard with information about the services, operation of the customer's data center, a summary of database violations, performance metrics, and the like. The content page may further show the available services that are stored in the service repository 530 of the gateway 110. Additional services purchased but not deployed by the specific customer may be determined from the account management module 316 of the portal 118 which may store a history of purchased and activated services.

The content section 902 of the UI 302 when the "My Services" is selected may display data related to specific services. For example, for a monitoring service, the content section 902 may display geospatial dashboards showing a mashup of key monitoring data that may be used by the customer to quickly determine the location of issued and drill down for more information. For a migration service, the content section 902 may display status of the migration, how many tables or parts of the database have been migrated, errors or inconsistencies discovered, remaining time to the end of the migration, and or the like. During the execution of a service the portal 118 may receive real time information about the status of the service from the enterprise manager 516 of the gateway 110.

In another example, a service may include a diagnostics and recommendations service. A user may run a service for diagnostics, the diagnostics may be reported to the portal and may further include recommendations displayed in the content section 902 when "My Services" is selected. The recommendations may include about what service should be run to diagnose problems, fix problems and the like. Recommendations may be based in part on customer data from the account management 316 module. The recommendation displayed in the content section 902 may also display the priority/urgency of the recommendation, and also the perceived impact to the customer for that recommendation. The recommendations may be displayed as a scorecard, summary, or a tree/heat map.

When the "Configurations" option is selected from the navigation header 800, the content section 902 of the UI 302 may display one or more lists of monitored and/or managed configurations. The content section may also be configurable to display asset inventory reporting. A managed configuration may include data related to the host or target system of the customer, information about the servers, databases, installed applications, installed middleware, and/or the like. The configuration may be used by other parts of the platform to configure services for the target server, select appropriate service, interpret messages from a service, and the like. The configuration may be periodically or continuously updated as software on the target system is updated or installed causing a change in a configuration. In embodiments a service may be deployed on the customer target systems to monitor and update the configurations.

When the "Service Analytics" option is selected from the navigation header 800, the content section 902 of the UI 302 may display service analytics the set of reports that a customer can access based on configuration, diagnostic and performance data collected for service delivery. Analytics may be used to spot key patterns, trends and data of value/interest to the customer. The content section 902 may display maps, graphs, and the like to allow the customer to determine the roadblock of performance, statistics of performance, activities, and/or the like. Service analytics information may be received in the portal from the persistent message storage 504 for the gateway 110. In some embodiments the portal may receive analytics information from the decision engine 538. The decision engine 538 may be configured to process messages from one or more monitoring services configured to provide analytics information.

When the "Service Requests" option is selected from the navigation header 800, the content section 902 of the UI 302 may display a summary and/or a list and a history of service requests, incident tickets, problem tickets, recommendations, and the like. A trending graph may show how a ticket's trend over the course of the Service Contracts.

When the "Documents" option is selected from the navigation header 800, the content section 902 of the UI 302 may display a list and/or a summary of documents delivered as part of the service. The documents may include data results, message results, and summaries of services and their outputs. The documents may include reports for each target system of the customer's data center. The documents presented in the UI 302 may be managed, organized, and in some cases generated by the documents module 318 of the portal 118.

When the "Accounts" option is selected from the navigation header 800, the content section 902 of the UI 302 may display a list and/or a summary of account information. The account information may include a representation of the services that a customer is entitled to as well as costs and/or charges associated with the services. The content section 902 may allow the customer to view contracts, renewing service and the like. The account management module 316 of the portal may generate an output to be displayed at the UI showing the accounts, history of the accounts, charges, services purchased, and the like. The account option may provide an interface for assigning access rights to users or administrators of the portal. Access rights may be assigned by each customer to administrators or users specifying what data they may access and what actions they may initiate.

When the "Alerts" option is selected from the navigation header 800, the content section 902 of the UI 302 may display a list and/or a summary of alerts and/or messages issued from any service.

When the "Appointments" option is selected from the navigation header 800, the content section 902 of the UI 302 may display a list and/or a summary of appointments, service due dates, and the like. The display may include a calendar for the customer and remote service provider to communicate key events, shows key customer dates and the like. The calendar may be used by the customer to specify preferred days for scheduling a service. In some embodiments the calendar may be used to prohibit the execution of some or all services. The block out dates may be used to limit server disruption during important product roll outs by the customer, for example.

Figure 10:
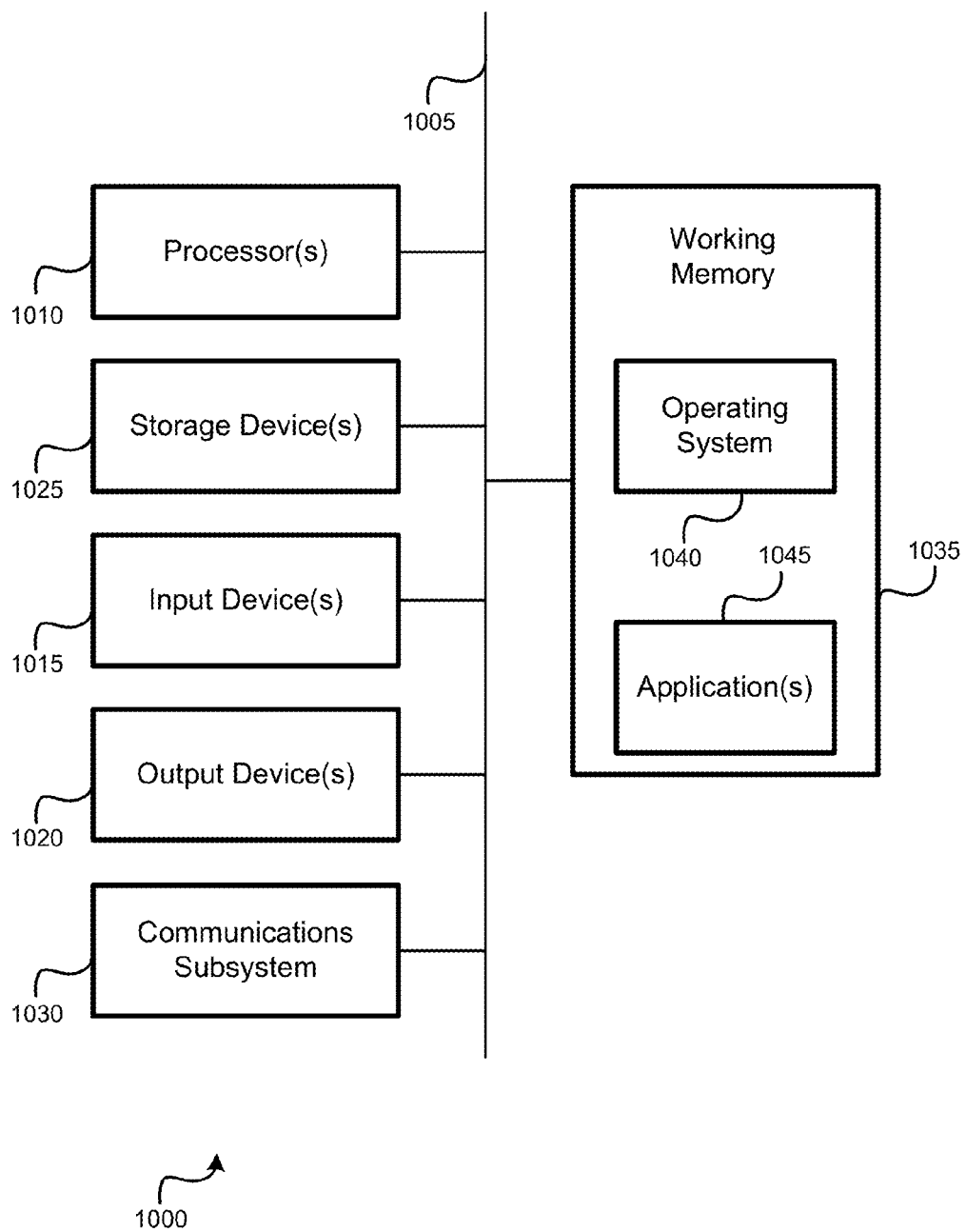
FIG. 10 illustrates an embodiment of a computer system.

FIG. 10 illustrates an embodiment of a computer system. A computer system as illustrated in FIG. 10 may be incorporated as part of the previously described computerized devices, such as the portal, gateway, and other elements of the platform 100. FIG. 10 provides a schematic illustration of one embodiment of a computer system 1000 that can perform various steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a keyboard, remote control, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

It should be understood that although many of the descriptions and examples were directed to a system and platform wherein the target system is a database, the platform, services, components, modules, and the like may be used for a wide range of target systems and applications including servers, operating systems, middleware, other applications, storage components, hardware components, and the like. Using the methods and systems described herein a service may be deployed for monitoring and diagnosing a hardware failure of a hard drive on a server, for example.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system, comprising:
 a processor; and
 a memory coupled with and readable by the processor and storing therein a set of instructions which, when executed by the processor, causes the processor to deploy and monitor a service during a software repair or upgrade process, by:
  receiving information relating to one or more target systems executing within a remote data center from a gateway on the remote data center, wherein the gateway receives the information based on monitoring of the one or more target systems, and wherein the received information includes one or more characteristics of existing services executing on each of the one or more target systems, and wherein the information received from the gateway further includes software version data and database types for the target systems executing within the remote data center;

defining a service specification for a new service based on the received information relating to the target systems, wherein the defined service specification is determined based at least on the software version data and database types for the target systems executing within the remote data center;

configuring the new service to be deployed on the target systems, wherein said configuration is based on the defined service specification for the new service;

deploying the configured new service within a test server infrastructure, wherein the test server infrastructure includes one or more additional executing services that are configured for execution based on the received characteristics of the existing services executing on the one or more target systems;

transmitting the configured new service to the gateway on the remote data center for deployment on the one or more target systems of the remote data center, following testing of the configured new service within the test server infrastructure, wherein the gateway is configured to initiate execution of the new service on the one or more target systems and capture event data related to the new service during execution of the new service on the one or more target systems;

receiving output data from the gateway, wherein the output data is based on the event data captured during execution of the new service;

analyzing the output data received from the gateway;

receiving a request for at least one of a status of the service or a summary of the output data;

generating a response to the request including at least one of an indication of the status of the new service or the summary of the output data, based on the output data received from the gateway; and transmitting the response to the request including the at least one of the indication of the status of the new service or the summary of the output data.

2. The system of claim 1, wherein the memory further comprises instructions which, when executed by the processor, causes the processor to deploy and monitor a service by:
authenticating a set of user credentials associated with the request, prior to generating the response to the request.

3. The system of claim 1, wherein the new service is a service from a plurality of services and wherein the memory further comprises instructions which, when executed by the processor, causes the processor to deploy and monitor the service by:
receiving a selection to purchase the new service from the plurality of services.

4. The system of claim 1, wherein the new service is a first service from a plurality of services and wherein the memory further comprises instructions which, when executed by the processor, causes the processor to deploy and monitor the first service by:
storing the output data in a repository; and
making the output data available to a second service from the plurality of services.

5. The system of claim 1, wherein the new service is a first service from a plurality of services and wherein the memory further comprises instructions which, when executed by the processor, causes the processor to deploy and monitor the first service by:
transmitting recommendation to a user of the remote data center to purchase a second service from the plurality of services.

6. The system of claim 5, wherein the recommendation is at least in part based on the received output data.

7. A method for deployment and monitoring of a service for a data center during a software repair or upgrade process, comprising:
receiving, at a portal, information relating to one or more target systems executing within the data center from a gateway of the data center, the portal being remote from the data center, wherein the gateway receives the information based on monitoring of the one or more target systems, and wherein the received information includes one or more characteristics of existing services executing on each of the one or more target systems, and wherein the information received from the gateway further includes software version data and database types for the target systems executing within the remote data center;

defining, by the portal, a service specification for a new service based on the received information relating to the target systems, wherein the defined service specification is determined based at least on the software version data and database types for the target systems executing within the remote data center;

configuring the new service, by the portal, to be deployed on the target systems, wherein said configuration is based on the defined service specification for the new service;

deploying, by the portal, the configured new service within a test server infrastructure, wherein the test server infrastructure includes one or more additional executing services that are configured for execution based on the received characteristics of the existing services executing on one or more target systems;

transmitting the configured new service to the gateway on the data center for deployment on the one or more target systems of the data center, following testing of the configured new service within the test server infrastructure, wherein the gateway is configured to initiate execution of the new service on the one or more target systems and capture event data related to the new service during execution of the new service on the one or more target systems;

receiving, at the portal, output data from the gateway, wherein the output data is based on the event data captured during execution of the new service;

analyzing, at the portal, the output data from the new service received from the gateway;

receiving a request for at least one of a status of the new service or a summary of and the output data;

generating a response to the request including at least one of an indication of the status of the new service or the summary of the output data, based on the output data received from the gateway; and transmitting the response to the request including the at least one of the indication of the status of the new service or the summary of the output data.

8. The method of claim 7, further comprising:
restricting access to the portal to authenticated users of the data center.

9. The method of claim 7, wherein the new service is a service from a plurality of services, the method further comprising:
receiving a selection to purchase the new service from the plurality of services.

10. The method of claim 7, wherein the new service is a first service from a plurality of services, the method further comprising:
storing the output data in a repository; and
making the output data available to a second service from the plurality of services.

11. The method of claim 7, wherein the new service is a first service from a plurality of services, the method further comprising:
transmitting a recommendation to a user of the data center to purchase a second service from the plurality of services.

12. The method of claim 11, wherein the recommendation is at least in part based on the received output data.

13. A computer program product residing on a non-transitory processor-readable medium and comprising processor readable instructions configured to cause one or more processors to:
receive, at a portal, information relating to one or more target systems executing within a data center from a gateway of the data center, the portal being remote from the data center, wherein the gateway receives the information based on monitoring of the one or more target systems, and wherein the received information includes one or more characteristics of existing services executing on each of the one or more target systems, and wherein the information received from the gateway further includes software version data and database types for the target systems executing within the remote data center;
define, by the portal, a service specification for a new service based on the received information relating to the target systems, wherein the defined service specification is determined based at least on the software version data and database types for the target systems executing within the remote data center;
configure the new service, by the portal, to be deployed on the target systems, wherein said configuration is based on the defined service specification for the new service;
deploy, by the portal, the configured new service within a test server infrastructure, wherein the test server infrastructure includes one or more additional executing services that are configured for execution based on the received characteristics of the existing services executing on the one or more target systems;
transmit the configured new service to the gateway on the data center for deployment on the one or more target systems of the data center, following testing of the configured new service within the test server infrastructure, wherein the gateway is configured to initiate execution of the new service on the one or more target systems and capture event data related to the new service during execution of the new service on the one or more target systems;
receive, at the portal, output data from the gateway, wherein the output data is based on the event data captured during execution of the new service;
analyzing, at the portal, the output data from the new service received from the gateway;
receive a request for at least one of a status of the new service or a summary of and the output data;
generate a response to the request including at least one of an indication of the status of the new service or the summary of the output data, based on the output data received from the gateway; and
transmit the response to the request including the at least one of the indication of the status of the new service or the summary of the output data.

14. The computer program product of claim 13, wherein the new service is a first service from a plurality of services and further comprising instructions configured to cause one or more processors to:
transmit a recommendation to a user of the data center to purchase a second service from the plurality of services.

15. The computer program product of claim 14, wherein the recommendation is at least in part based on the received output data.

16. The system of claim 1, wherein the memory further comprises instructions which, when executed by the processor, causes the processor to deploy and monitor a service by:
redeveloping the new service into one or more reusable components.

17. The system of claim 1, wherein the information received from the gateway includes usage data for the one or more target systems executing within the remote data center, and
wherein the service specification is further determined based on the usage data for the target systems.

18. The system of claim 1, wherein the gateway receives information from a plurality of target systems having different system specifications, and
wherein the service specification is further determined based on the system specifications of each of the plurality of target systems.

19. The system of claim 1, wherein the test server infrastructure comprises a production cloud environment separate from the remote data center, and
wherein the deployment of the new service onto the one or more target systems of the remote data center is managed by deployment scripts residing in the production cloud environment.

* * * * *

UNITED STATES PATENT AND TRADEMARK OFFICE
CERTIFICATE OF CORRECTION

PATENT NO. : 9,967,154 B2
APPLICATION NO. : 13/937970
DATED : May 8, 2018
INVENTOR(S) : Masterson et al.

Page 1 of 1

It is certified that error appears in the above-identified patent and that said Letters Patent is hereby corrected as shown below:

On the Title Page

In Column 1, under Notice, Line 3, delete "days. days." and insert -- days. --, therefor.

In the Drawings

On sheet 1 of 10, in FIG. 1, under Reference Numeral 126, Line 2, delete "Ifrastructure" and insert -- Infrastructure --, therefor.

In the Specification

In Column 8, Line 54, delete "and or" and insert -- and/or --, therefor.

In Column 9, Line 56, delete "and or" and insert -- and/or --, therefor.

In Column 14, Line 2, delete "and or" and insert -- and/or --, therefor.

In the Claims

In Column 20, Line 41, in Claim 7, after "on" insert -- the --.

Signed and Sealed this
Thirteenth Day of November, 2018

Andrei Iancu
*Director of the United States Patent and Trademark Office*